US012288632B2

(12) United States Patent
Liao et al.

(10) Patent No.: US 12,288,632 B2
(45) Date of Patent: Apr. 29, 2025

(54) COPPER FOIL STRUCTURE AND MANUFACTURING METHOD THEREOF

(71) Applicant: NAN YA PLASTICS CORPORATION, Taipei (TW)

(72) Inventors: Te-Chao Liao, Taipei (TW); Wei-Sheng Cheng, Taipei (TW); Chao-Tung Wu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 357 days.

(21) Appl. No.: 18/154,035

(22) Filed: Jan. 12, 2023

(65) Prior Publication Data

US 2024/0177884 A1 May 30, 2024

(30) Foreign Application Priority Data

Nov. 25, 2022 (TW) .................................. 111145238

(51) Int. Cl.
*H01B 5/00* (2006.01)
*H01B 1/02* (2006.01)

(52) U.S. Cl.
CPC ............... *H01B 5/002* (2013.01); *H01B 1/02* (2013.01)

(58) Field of Classification Search
None
See application file for complete search history.

(56) References Cited

U.S. PATENT DOCUMENTS

2004/0060729 A1* 4/2004 Knadle .................. H05K 3/386 174/255

FOREIGN PATENT DOCUMENTS

| | | | | |
|---|---|---|---|---|
| CN | 1158349 | | 9/1997 | |
| CN | 1050449 | | 3/2000 | |
| CN | 101007925 A | * | 8/2007 | B05D 1/36 |
| CN | 100567427 | | 12/2009 | |
| CN | 102280656 | | 12/2011 | |
| CN | 111472005 | | 7/2020 | |
| CN | 111472005 A | * | 7/2020 | C23F 11/02 |
| DE | 19653196 A1 | * | 6/1997 | C09D 163/00 |
| TW | I749569 | | 12/2021 | |

OTHER PUBLICATIONS

Kim—DE 19653196 A1—sis IDS—MT—conductive polyaniline w-camphorsulfonic acid—1997 (Year: 1997).*
Huang—CN 100567427 C—IDS—MT—anticorrosion paint w-analine copolymer—2009 (Year: 2009).*
Ma—CN 111472005 A—IDS—MT—antioxidant on copper—2-mercaptobenzoxazole—2020 (Year: 2020).*
"Office Action of Taiwan Counterpart Application", issued on Dec. 4, 2023, p. 1-p. 8.

* cited by examiner

*Primary Examiner* — John Vincent Lawler
(74) *Attorney, Agent, or Firm* — JCIPRNET

(57) ABSTRACT

A copper foil structure and a manufacturing method thereof are provided. In some embodiments, the copper foil structure includes a copper foil layer and a conductive organic anti-oxidation layer. The conductive organic anti-oxidation layer is disposed on the copper foil layer, and the conductive organic anti-oxidation layer includes an organic antioxidant and a conductive polymer.

9 Claims, 1 Drawing Sheet

10a

COPPER FOIL STRUCTURE AND MANUFACTURING METHOD THEREOF

CROSS-REFERENCE TO RELATED APPLICATION

This application claims the priority benefit of Taiwan application serial no. 111145238, filed on Nov. 25, 2022. The entirety of the above-mentioned patent application is hereby incorporated by reference herein and made a part of this specification.

BACKGROUND

Technical Field

The present disclosure relates to a copper foil structure, and particularly relates to a surface-treated copper foil structure and a manufacturing method thereof.

Description of Related Art

A copper foil itself is easily oxidized to form copper oxide, so as to affect the conductivity thereof. The current technology is to impregnate a copper foil with a metal or an organic antioxidant for surface treatment to prevent oxidation of the copper surface.

However, the surface treatment of a copper foil also limits the application of copper foil. For example, in a lithium battery, the cathode can be sequentially composed of a copper foil, an anti-oxidation layer and an electrode material. When the anti-oxidation layer is too thick, the resistance between the electrode material and the copper foil is increased, thereby affecting the activity of the electrode and the cycle maintenance rate of the battery. When the anti-oxidation layer is too thin, it may affect its anti-oxidation ability, which is unfavorable for reliability in battery processing. Therefore, how to develop a novel anti-oxidation layer having an anti-oxidation ability without affecting the conductivity of the copper foil has become a main goal in the industry.

SUMMARY

The present disclosure provides a copper foil structure and a manufacturing method thereof. After the copper foil is subjected to a surface treatment, the oxidation of the copper surface and therefore the resistance increase can be effectively prevented.

The present disclosure provides a copper foil structure including a copper foil layer and a conductive organic anti-oxidation layer. The conductive organic anti-oxidation layer is disposed on the copper foil layer. The conductive organic anti-oxidation layer includes an organic antioxidant and a conductive polymer.

In an embodiment of the present disclosure, the copper foil structure further includes a metal anti-oxidation layer. The metal anti-oxidation layer is disposed between the copper foil layer and the conductive organic anti-oxidation layer.

In an embodiment of the present disclosure, the copper foil structure further includes a metal anti-oxidation layer. The metal anti-oxidation layer is disposed on the copper foil layer, and the conductive organic anti-oxidation layer is located between the copper foil layer and the metal anti-oxidation layer.

In an embodiment of the present disclosure, the conductive polymer is selected from at least one of polyaniline (PANI), polypyrrole (PPy), polythiophene (PT) and polyphenylene sulfide (PPS).

In an embodiment of the present disclosure, based on the total weight of the conductive organic anti-oxidation layer, a content of the conductive polymer ranges from 0.01 wt % to 5 wt %.

In an embodiment of the present disclosure, the conductive organic anti-oxidation layer further includes camphorsulfonic acid (CSA), and a content ratio of the conductive polymer to the camphorsulfonic acid ranges from 1:0.25 to 1:4.

In an embodiment of the present disclosure, the organic antioxidant is selected from at least one of 2-mercaptobenzoxazole (MBO), benzotriazole, 4-carboxybenzotriazole, 5-aminotetrazole and 3-aminotriazole (or called "triazol-3-amine" in some examples).

In an embodiment of the present disclosure, based on the total weight of the conductive organic anti-oxidation layer, a content of the organic antioxidant ranges from 95 wt % to 99.9 wt %.

The present disclosure further provides a manufacturing method of a copper foil structure that includes the following steps. A copper foil is provided. Next, a conductive organic anti-oxidation layer is formed on the copper foil layer. The conductive organic anti-oxidation layer includes an organic antioxidant and a conductive polymer.

In an embodiment of the present disclosure, the conductive organic anti-oxidation layer further includes camphorsulfonic acid, and the method of forming the conductive organic anti-oxidation layer on the copper foil layer includes the following steps. Camphorsulfonic acid and a conductive polymer are mixed to obtain the camphorsulfonic acid-doped conductive polymer. Next, the camphorsulfonic acid-doped conductive polymer and an organic antioxidant are mixed to obtain a conductive organic antioxidant solution. Then, the conductive organic antioxidant solution is coated on the copper foil to form the conductive organic anti-oxidation layer.

Based on the above, the present disclosure provides a conductive organic anti-oxidation layer with conductivity by adding a conductive polymer to an organic anti-oxidation layer. In this way, the surface oxidation of the copper foil can be prevented, and the resistance increase can also be effectively prevented.

DESCRIPTION OF THE EMBODIMENTS

Embodiments of the disclosure will be described in details below. However, these embodiments are illustrative, and the disclosure is not limited thereto.

Herein, a range indicated by "one value to another value" is a general representation which avoids enumerating all values in the range in the specification. Therefore, the description of a specific numerical range covers any numerical value within the numerical range and the smaller numerical range bounded by any numerical value within the numerical range, as if the arbitrary numerical value and the smaller numerical range are written in the specification.

Figure 1:
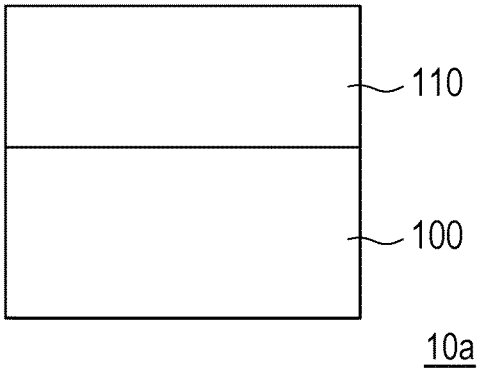
FIG. 1 is a schematic cross-sectional view of a copper foil structure according to an embodiment of the present disclosure.

FIG. 1 is a schematic cross-sectional view of a copper foil structure according to an embodiment of the present disclosure. Referring to FIG. 1, a copper foil structure 10*a* includes a copper foil layer 100 and a conductive organic anti-oxidation layer 110. The conductive organic anti-oxidation layer 110 can be disposed on the copper foil layer 100. Specifically, in this embodiment, the conductive organic anti-oxidation layer 110 is attached and completely covers one surface of the copper foil layer 100. The conductive organic anti-oxidation layer 110 prevents the copper foil 100 from being exposed to the air or the environment and therefore prevents copper oxide from forming on the surface and affecting the conductivity of the copper foil.

In this embodiment, the conductive organic anti-oxidation layer 110 may include an organic antioxidant and a conductive polymer, and the conductivity of the conductive polymer is greater than the conductivity of the organic antioxidant. Specifically, the conductive polymer may include, for example but not limited thereto, a nitrogen-containing conductive polymer. Preferably, the conductive polymer may include, for example but not limited to, at least one or more of polyaniline, polypyrrole, polythiophene and polyphenylene sulfide. In some embodiments, based on the total weight of the conductive organic anti-oxidation layer 110, the content of the conductive polymer may range from 0.01 wt % to 5 wt %. In some preferred embodiments, the content of the conductive polymer may range from 0.01 wt % to 2 wt %. When the content of the conductive polymer is less than 0.01 wt % (e.g., corresponding to the case without adding a conductive polymer), the effect of improving the conductivity may become poor. When the content of the conductive polymer is greater than 5 wt %, the anti-oxidation effect may be affected. When the content of the conductive polymer is greater than 5 wt %, the compatibility of the conductive polymer may become poor. When the content of the conductive polymer falls within the above-mentioned range, the formed conductive organic anti-oxidation layer can exhibit a better conductive property.

In this embodiment, the organic antioxidant may include, for example but not limited to, at least one or more of 2-mercaptobenzoxazole, benzotriazole, 4-carboxybenzotriazole, 5-aminotetrazole and 3-aminotriazole. In some embodiments, based on the total weight of the conductive organic anti-oxidation layer 110, the content of the organic antioxidant may range from 95 wt % to 99.99 wt %. When the content of the organic antioxidant is less than 95 wt % (e.g., corresponding to the case with insufficient amount of the antioxidant), the antioxidant effect may become poor. When the content of the organic antioxidant falls within the above-mentioned range, the formed conductive organic anti-oxidation layer may exhibit a better antioxidant property. It is noted that, in some embodiments, the content of the organic antioxidant may be adjusted according to the content of the conductive polymer, so as to achieve the best anti-oxidation effect while preventing the resistance value from increasing.

In addition, the conductive organic anti-oxidation layer 110 may further include camphorsulfonic acid (CSA). The camphorsulfonic acid can be doped in the conductive polymer, so as to help the conductive polymer increase the conductivity. In some embodiments, the content ratio of the conductive polymer to the camphorsulfonic acid may range from 1:0.25 to 1:4. In some preferred embodiments, the content ratio of the conductive polymer to the camphorsulfonic acid may range from 1:0.5 to 1:1. When the content ratio of the conductive polymer to the camphorsulfonic acid is less than 1:0.25, the increase in conductivity is not obvious. When the content ratio of the conductive polymer to the camphorsulfonic acid is greater than 1:4, the overall antioxidant effect may be affected. When the content ratio of the conductive polymer to the camphorsulfonic acid falls within the above-mentioned range, the formed conductive organic anti-oxidation layer can exhibit a better conductive property.

Referring to FIG. 1 again, in this embodiment, the manufacturing method of the copper foil structure 10*a* may include, for example but not limited to, the following steps. A copper foil layer 100 is provided. Next, a conductive organic anti-oxidation layer 110 is formed on the copper foil layer 100, and the conductive organic anti-oxidation layer 110 includes an organic antioxidant and a conductive polymer.

Specifically, the method for forming the conductive organic anti-oxidation layer 110 on the copper foil layer 100 includes, for example but not limited to, the following steps. The organic antioxidant and the conductive polymer are uniformly mixed in a solvent to prepare a conductive organic anti-oxidation coating solution. Next, the conductive organic anti-oxidation coating solution is coated on the surface of the copper foil layer 100. In an embodiment, the coating method may include, for example but not limited thereto, a dipping process, a spraying process, or the like. Next, a baking process is performed to remove the moisture in the conductive organic anti-oxidation coating solution and therefore form the conductive organic anti-oxidation layer 110. That is to say, the conductive organic anti-oxidation layer 110 is substantially free of water. It is noted that, in this embodiment, the conductive organic anti-oxidation layer 110 is a single layer, but the disclosure is not limited thereto. In some embodiments, multiple coating processes may be performed as needed, so as to form multiple conductive organic anti-oxidation layers 110 on the copper foil layer 100.

In some embodiments, when the conductive organic anti-oxidation layer 110 includes camphorsulfonic acid, the preparation of the conductive organic antioxidant solution may include, for example but not limited to, the following two methods. In <Method 1>, an organic antioxidant, a conductive polymer, and camphorsulfonic acid are respectively added and uniformly mixed to form a conductive organic antioxidant solution. For example, the conductive organic antioxidant solution of Example 2 is prepared by <Method 1>. In <Method 2>, camphorsulfonic acid and a conductive polymer are mixed to obtain a camphorsulfonic acid-doped conductive polymer, and the camphorsulfonic acid-doped conductive polymer is mixed with an organic antioxidant to obtain a conductive organic antioxidant solution. For example, the conductive organic antioxidant solution of Example 3 is prepared by <Method 2>. The camphorsulfonic acid is added to improve the conductivity property of the conductive polymer. Under the same concentration ratio (e.g., the same content ratio of camphorsulfonic acid to conductive polymers), <Method 2> in which a camphorsulfonic acid-doped conductive polymer is first formed followed by adding an organic antioxidant provides a better conductivity property than <Method 1> in which an organic antioxidant, a conductive polymer, and camphorsulfonic acid are mixed together.

Generally speaking, a copper foil is easily oxidized to form copper oxide. Therefore, in the application, the copper foil is usually subjected to a surface treatment to form an organic anti-oxidation layer or/and a metal anti-oxidation layer on the surface of the copper foil, for preventing the formation of copper oxide. However, when the anti-oxidation layer is too thin, there is not effect for inhibiting oxidation. When the anti-oxidation layer is too thick, the resistance between an active material overlying the anti-oxidation layer (but not in contact with the copper foil) and the copper foil is increased, and thus, the conductivity of the copper foil is affected. In this embodiment, a conductive polymer is added to an organic anti-oxidation layer, so as to make the anti-oxidation layer conductive. Therefore, the conductive anti-oxidation layer of the disclosure prevents oxidation of the copper foil, prevents the resistance increase and maintain the conductivity property.

Figure 2:
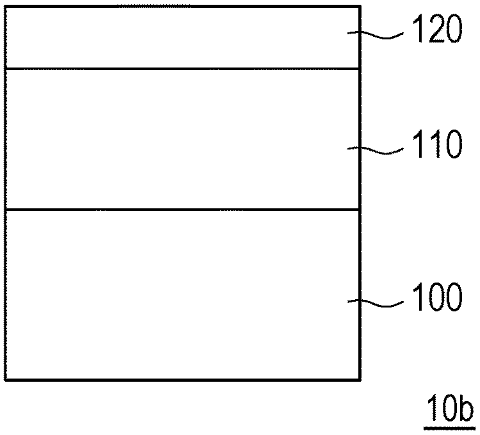
FIG. 2 is a schematic cross-sectional view of a copper foil structure according to another embodiment of the present disclosure.

FIG. 2 is a schematic cross-sectional view of a copper foil structure 10*b* according to another embodiment of the present disclosure. Referring to FIG. 1 and FIG. 2 simultaneously, the copper foil structure 10*b* is similar to the copper foil structure 10*a*, and the difference between them lies in that, the copper foil structure 10*b* further includes a metal anti-oxidation layer 120. The metal anti-oxidation layer 120 is disposed on the copper foil layer 100, and the conductive organic anti-oxidation layer 110 is located between the copper foil layer 100 and the metal anti-oxidation layer 120.

In this embodiment, as compared with the copper foil structure 10*a* (as shown in FIG. 1) having a single-layer organic anti-oxidation layer 110, the copper foil structure 10*b* having two layers of anti-oxidation layers (i.e., a conductive organic anti-oxidation layer 110 and a metal anti-oxidation layer 120) provides better heat resistance.

Figure 3:
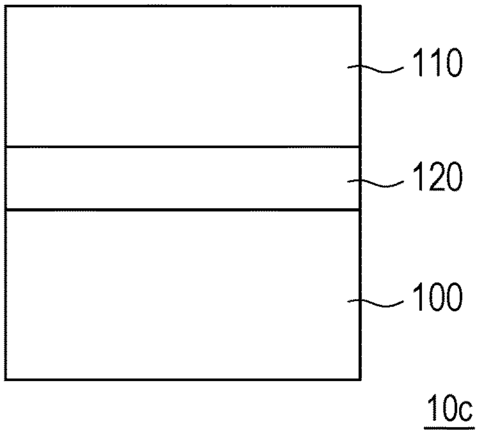
FIG. 3 is a schematic cross-sectional view of a copper foil structure according to another embodiment of the present disclosure.

FIG. 3 is a schematic cross-sectional view of a copper foil structure 10*c* according to another embodiment of the present disclosure. Referring to FIG. 2 and FIG. 3 simultaneously, the copper foil structure 10*c* is similar to the copper foil structure 10*b*, and the different between them lies in that, in the copper foil structure 10*c*, the metal anti-oxidation layer 120 is disposed between the copper layer 100 and the anti-oxidation layers 110.

The following examples and comparative examples are provided to illustrate the effect of the present disclosure. However, the following experimental examples are not intended to limit the scope of the present disclosure.

Experimental Example

Preparation of Copper Foil Structure

The manufacturing methods of the copper foil structures of Comparative Examples 1-2 and Example 1-3 have been described in details above, so the details are not iterated herein. In addition, the composition in Table 1 represents the composition of components of the organic anti-oxidation layer of each of Comparative Examples 1-2 and Example 1-3.

Performance Evaluation

ΔE value: After a copper foil is impregnated with an antioxidant solution, the copper foil is dried by hot air, and then put in an oven (160° C., 15 minutes). The color difference/change before and after heating is analyzed by a colorimeter.

Resistance: After a copper foil is impregnated with an antioxidant solution, the copper foil is dried by hot air. The resistance value is measured by a Wheatstone bridge.

High-temperature and high-humidity ΔE value: After a copper foil is impregnated with an antioxidant solution, the copper foil is dried by hot air, and then put in a constant temperature and humidity oven (50° ° C., 95% humidity) for 24 hours. The color difference/change before and after heating is analyzed by a colorimeter.

TABLE 1

| | Comparative Example 1 | Comparative Example 2 | Example 1 | Example 2 | Example 3 |
|---|---|---|---|---|---|
| Composition of organic anti-oxidation coating solution | | | | | |
| water | | 100 | 100 | 100 | 100 |
| 2-mercaptobenzoxazole | | 0.1 | 0.1 | 0.1 | 0.1 |
| benzotriazole | | 0.2 | 0.2 | 0.2 | 0.2 |
| polyaniline | | | 0.005 | 0.005 | |
| camphorsulfonic acid | | | | 0.0025 | |
| camphorsulfonic acid-doped polyaniline | | | | | 0.0075 |
| Performance evaluaton | | | | | |
| ΔE value (160° C., 15 minutes) | | 6.18 | 5.47 | 6.30 | 6.36 |
| resistance (Ω) (room temperature) | 0.05188 | 0.05450 | 0.05352 | 0.05293 | 0.05024 |
| high-temperature and high-humidity ΔE value (50° C., ' 95% humidity, 24 hours) | | 7.05 | 5.80 | 7.36 | 6.52 |

As shown in the components of the organic anti-oxidation coating solutions in Table 1, the difference between copper foil structures of Comparative Example 1, Comparative Example 2, Example 1, Example 2 and Example 3 mainly lies in the coating composition on the surface of a copper foil layer. Specifically, in Comparative Example 1, only a copper foil layer is provided, without any organic anti-oxidation layer coated thereon. In Comparative Example 2, an organic anti-oxidation layer containing an organic antioxidant is coated on a copper foil layer. In Example 1, a conductive organic anti-oxidation layer containing an organic antioxidant and a conductive polymer is coated on a copper foil layer. In Example 2, a conductive organic anti-oxidation layer containing an organic antioxidant, a conductive polymer and camphorsulfonic acid is coated on a copper foil layer. In Example 3, a conductive organic anti-oxidation layer containing a camphorsulfonic acid-doped conductive polymer is coated on a copper foil layer.

As shown in the performance evaluation results in Table 1, as compared with the copper foil structure of Comparative Example 1 (in which only a copper foil layer is provided), the copper foil structure of Comparative Example 2 (in which an organic anti-oxidation layer is coated on a copper foil layer) exhibits a higher resistance value; that is, the resistance value is significantly increased (from 0.05188Ω to 0.05450Ω) because coating an organic anti-oxidation layer reduces the conductivity. As compared with the copper foil structures of Comparative Examples 1-2, the copper foil structure of each of Examples 1-3 is more conductive by adding a conductive polymer into an organic anti-oxidation layer, thereby providing a conductive organic anti-oxidation layer while preventing the resistance value of the organic anti-oxidation layer from increasing. Among them, the copper foil structure of Example 3 (in which the conductive organic anti-oxidation layer contains a camphorsulfonic acid-doped conductive polymer) exhibits the best conductive property and the most remarkable effect of suppressing the decrease in resistance value.

In addition, the ΔE value is the color difference/change on the surface of the copper foil, which can be regarded as the degree of oxidation of the copper foil. Specifically, when copper oxide is formed on the surface of the copper foil, the color will change, and the color change can be used to evaluate the oxidation degree of the copper foil surface. When the ΔE value is less than 8, it indicates no significant change in color. As shown in the results of ΔE values in Table 1, the anti-oxidation effects are similar, no matter whether the conductive polymer is added to the organic anti-oxidation layer (Comparative Example 2, Example 1, Example 2, Example 3). In other words, adding a conductive polymer does not adversely affect the antioxidant ability.

In summary, the present disclosure makes the anti-oxidation layer conductive by adding a conductive polymer to an organic anti-oxidation layer. In this way, the surface oxidation of the copper foil can be prevented, and the resistance increase can also be effectively prevented.

Although the present disclosure has been disclosed above with the embodiments, it is not intended to limit the present disclosure. Anyone with ordinary knowledge in the technical field may make some changes and modifications without departing from the spirit and scope of the present disclosure. The scope of protection of the present disclosure should be defined by the scope of the appended patent application.

What is claimed is:

1. A copper foil structure, comprising:
a copper foil layer; and
a conductive organic anti-oxidation layer disposed on the copper foil layer, wherein the conductive organic anti-oxidation layer comprises an organic antioxidant and a conductive polymer,
wherein based on the total weight of the conductive organic anti-oxidation layer, a content of the organic antioxidant ranges from 95 wt % to 99.9 wt %.

2. The copper foil structure according to claim 1, further comprising:
a metal anti-oxidation layer disposed between the copper foil layer and the conductive organic anti-oxidation layer.

3. The copper foil structure according to claim 1, further comprising:
a metal anti-oxidation layer disposed on the copper foil layer, wherein the conductive organic anti-oxidation layer is located between the copper foil layer and the metal anti-oxidation layer.

4. The copper foil structure according to claim 1, wherein the conductive polymer is selected from at least one of polyaniline, polypyrrole, polythiophene and polyphenylene sulfide.

5. The copper foil structure according to claim 1, wherein based on a total weight of the conductive organic anti-oxidation layer, a content of the conductive polymer ranges from 0.01 wt % to 5 wt %.

6. The copper foil structure according to claim 1, wherein the conductive organic anti-oxidation layer further comprises camphorsulfonic acid, and a content ratio of the conductive polymer to the camphorsulfonic acid ranges from 1:0.25 to 1:4.

7. The copper foil structure according to claim 1, wherein the organic antioxidant is selected from at least one of 2-mercaptobenzoxazole, benzotriazole, 4-carboxybenzotriazole, 5-aminotetrazole and 3-aminotriazole.

8. A method of manufacturing a copper foil structure of claim 1, comprising:
providing the copper foil layer; and
forming the conductive organic anti-oxidation layer on the copper foil layer.

9. The manufacturing method according to claim 8, wherein the conductive organic anti-oxidation layer further comprises camphorsulfonic acid, and a method of forming the conductive organic anti-oxidation layer on the copper foil layer comprises:
mixing the camphorsulfonic acid and the conductive polymer to obtain a camphorsulfonic acid-doped conductive polymer;
mixing the camphorsulfonic acid-doped conductive polymer and the organic antioxidant to obtain a conductive organic anti-oxidation coating solution; and
coating the conductive organic anti-oxidation coating solution on the copper foil layer to form the conductive organic anti-oxidation layer.

* * * * *